United States Patent
Hilker et al.

(10) Patent No.: US 12,461,136 B2
(45) Date of Patent: Nov. 4, 2025

(54) ARRESTER SYSTEM OF PARALLEL-CONNECTED ARRESTERS, AND METHOD FOR DETECTING FAULTS OF THE ARRESTERS

(71) Applicant: Siemens Energy Global GmbH & Co. KG, Munich (DE)

(72) Inventors: Thomas Hilker, Stahnsdorf (DE); Henrik Roggow, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 99 days.

(21) Appl. No.: 18/245,193

(22) PCT Filed: Sep. 3, 2021

(86) PCT No.: PCT/EP2021/074403
§ 371 (c)(1),
(2) Date: Mar. 14, 2023

(87) PCT Pub. No.: WO2022/053409
PCT Pub. Date: Mar. 17, 2022

(65) Prior Publication Data
US 2023/0358799 A1    Nov. 9, 2023

(30) Foreign Application Priority Data
Sep. 14, 2020   (DE) .............. 10 2020 211 487.0

(51) Int. Cl.
*G01R 31/12* (2020.01)
*G01R 31/52* (2020.01)

(52) U.S. Cl.
CPC ......... *G01R 31/1236* (2013.01); *G01R 31/52* (2020.01); *G01R 31/1227* (2013.01)

(58) Field of Classification Search
CPC .... G01R 31/00; G01R 31/12; G01R 31/1218; G01R 31/1227; G01R 31/1236; G01R 31/50; G01R 31/52; G01R 31/74
USPC ................. 324/500, 512, 522, 537, 550
See application file for complete search history.

(56) References Cited

U.S. PATENT DOCUMENTS

| 12,261,271 B2 * | 3/2025 | Itakura ................. H01M 10/48 |
| 2014/0247057 A1 * | 9/2014 | Rodseth ............... G01R 31/74 324/550 |
| 2017/0108550 A1 | 4/2017 | Raschke | |

FOREIGN PATENT DOCUMENTS

| CN | 103163396 A * | 6/2013 | ......... G01R 31/00 |
| CN | 104360197 A * | 2/2015 | ......... G01R 31/00 |
| CN | 105388374 A | 3/2016 | |
| CN | 105552874 A | 5/2016 | |
| CN | 106501631 A | 3/2017 | |

(Continued)

*Primary Examiner* — Hoai-An D. Nguyen
(74) *Attorney, Agent, or Firm* — Laurence A. Greenberg; Werner H. Stemer; Ralph E. Locher

(57) ABSTRACT

An arrester system has at least two parallel-connected arresters, each with a sensor for determining leakage currents. A monitoring system is configured to detect faults at the arresters by comparing sensor data. The method for detecting faults at parallel-connected arresters includes comparing in particular the present measured values of the arresters and/or from sensors of the arresters. A fault is detected when there are deviations between measured values of different arresters. The arrester system is identified as fault-free when measured values of the arresters, in particular of all arresters, are substantially the same.

17 Claims, 1 Drawing Sheet

(56) References Cited

FOREIGN PATENT DOCUMENTS

| | | | | |
|---|---|---|---|---|
| CN | 113725510 A | * | 11/2021 | .......... H01M 10/482 |
| DE | 4232208 A1 | * | 4/1993 | ............. G01R 19/17 |
| DE | 102015013433 B3 | | 1/2017 | |
| EP | 2333925 A1 | | 6/2011 | |
| JP | H04206375 A | | 7/1992 | |
| JP | H08248091 A | * | 9/1996 | ............. G01R 31/02 |
| JP | H0950877 A | * | 2/1997 | ............. G01R 31/00 |
| KR | 100593710 B1 | * | 6/2006 | ......... G01R 31/1236 |
| KR | 102789235 B1 | * | 3/2025 | ........... G01R 19/165 |

* cited by examiner

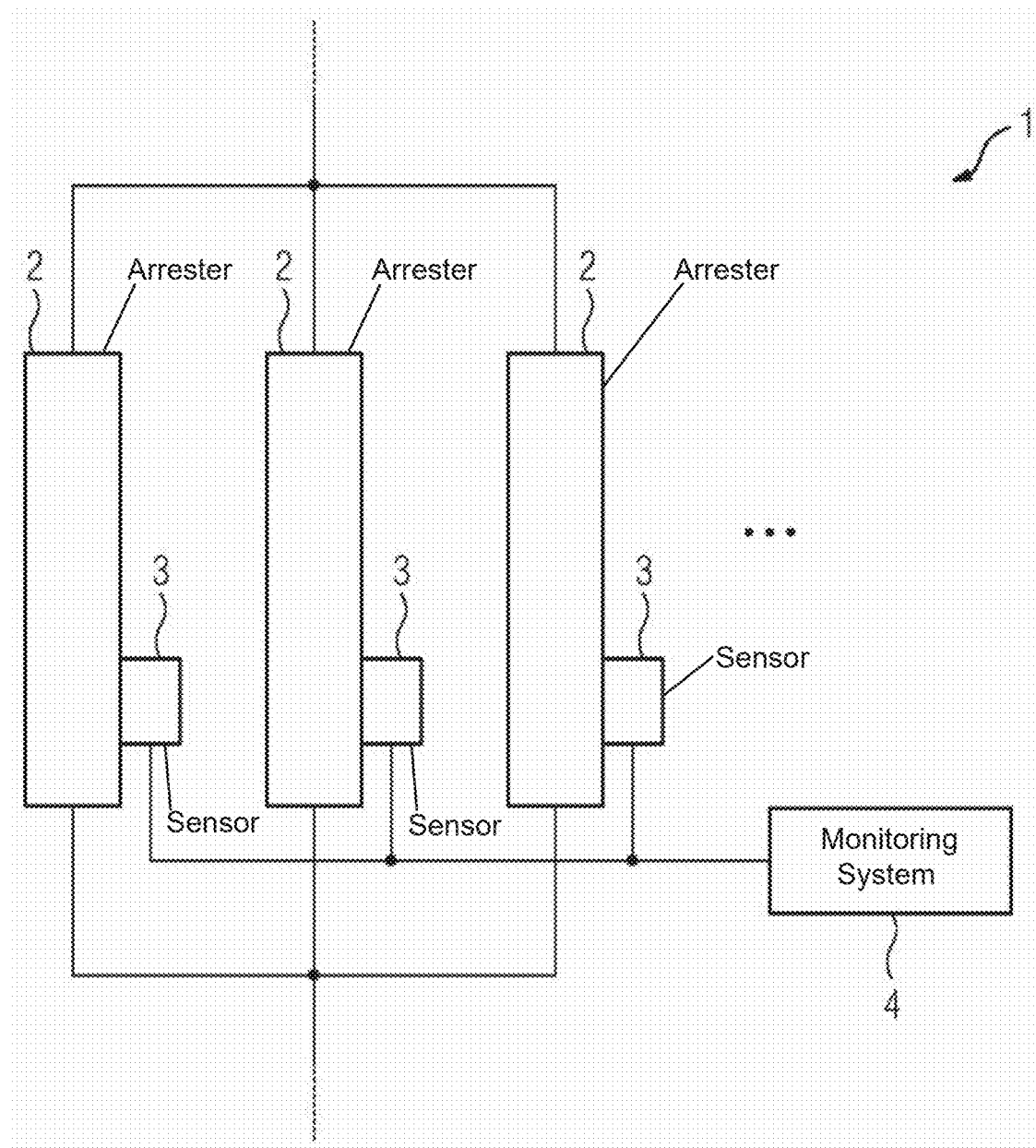

ARRESTER SYSTEM OF PARALLEL-CONNECTED ARRESTERS, AND METHOD FOR DETECTING FAULTS OF THE ARRESTERS

FIELD AND BACKGROUND OF THE INVENTION

The invention relates to an arrester system and a method for detecting faults at parallel-connected arresters, comprising at least two parallel-connected arresters which each comprise a sensor for determining leakage currents.

Arrester systems comprise more than one arrester, which for example are connected parallel to one another. Surge arresters for medium-voltage applications ensure a reliable surge protection for medium-voltage applications in the region of a thousand volts up to 71.5 kV. Arresters for high-voltage applications protect equipment in installations for applications in the region of up to 1200 kV. Surges, which are created for example by direct or nearby lightning strikes, by magnetic storms, in particular caused by the sun, by electromagnetic pulses, i.e. EMPs, by electrostatic discharges or switching operations in the power network and/or equipment, have at times major momentary powers. These may lead to damage and/or destruction of equipment, installations and/or lines and power networks. Arrester systems protect equipment and/or installations, in particular current generators and/or current consumers, in the power network and/or lines, and also the power network itself, by breaking down surges.

For reliable protection, functional undamaged arresters are indispensable. For this purpose, a monitoring of leakage currents is performed for example on arresters in the medium and/or high voltage range in order to identify damage of arresters in good time. The leakage current of an arrester may not exceed a defined limit value, since the arrester otherwise becomes thermally unstable and there is a high likelihood of failure. However, various processes, for example temporary overloading or ageing of arresters, lead to a change of leakage currents. An assessment of a leakage current is thus only possible if the long-term behavior of the leakage current is assessed. Such a trend consideration allows faulty arresters to be exchanged in good time and makes it possible to avoid complete failures.

To assess the state of an arrester, the long-term behavior of the arrester leakage current is monitored. If the current rises continuously, it is assumed that the arrester has a fault. Long-term observations, however, are costly and generally only possible from a central control room, in which measurement results are stored and the stored results are monitored over long periods of time. A short-term assessment for example of maintenance staff on-site is thus not possible or is only possible to a very limited extent.

SUMMARY OF THE INVENTION

The object of the present invention is to describe an arrester system and a method for detecting faults at parallel-connected arresters which solve the previously described problems. In particular, the object is to describe an arrester system which makes it possible to detect and/or to identify faults at arresters or faulty arresters in short periods of time in order to avoid damage in the power network and/or at equipment and installations in the supply and to save costs.

The stated object is achieved in accordance with the invention by an arrester system having the features as claimed and/or by a method for detecting faults at parallel-connected arresters, in particular at arresters of a previously described arrester system, as claimed. Advantageous embodiments of the arrester system according to the invention and/or of the method according to the invention for detecting faults at parallel-connected arresters, in particular at arresters of a previously described arrester system, are described in the dependent claims. The subjects of the main claims are combinable here with one another and with features of dependent claims, and features of the dependent claims are also combinable with one another.

An arrester system according to the invention comprises at least two parallel-connected arresters, which each comprise a sensor for determining leakage currents. A monitoring system is comprised by the arrester system and is designed to detect faults at arresters by comparison of sensor data.

For parallel-connected arresters, for example in HVDC or FSC applications, there is the possibility for short-term assessment of the state of individual arresters. Each of the parallel-connected arresters is equipped for example with a possibility for leakage current measurement. This measurement can be performed for example inductively and/or via a shunt resistor, wherein a coil and/or the resistor represent a sensor for currents. The leakage current information is fed for example into an evaluation unit which is part of a monitoring system. There, the leakage current values of the individual arresters are compared with one another. If a short-term overload leads to a rise in the leakage current, this rise is then determined for all arresters.

If, however, a rise in the leakage current is determined at just one arrester, whereas the leakage current of the other arresters remains unchanged, the arrester then has a fault or an imminent fault. Appropriate measures can be taken. Alternatively to the leakage current, the measurement of the temperature of individual arresters is possible, for example. The thermal failure of an arrester is caused by a rise in the ohmic component of the leakage current. The ohmic proportion in the leakage current and the temperature of the arrester correlate directly. A comparison of the temperatures of the individual arresters thus has the same significance as the comparative leakage current measurement.

The monitoring system of the arrester system according to the invention, with at least two parallel-connected arresters, wherein the arresters each comprise a sensor for determining leakage currents, is designed to detect and/or to identify faults at arresters or faulty arresters within short periods of time by comparison of sensor data, in order to avoid damage in the power network and/or at equipment and installations in the network and in order to save costs.

The monitoring system can be designed to detect faults at arresters by short-term measurement of the sensors, in particular measurements with a duration in the range of nanoseconds, milliseconds, seconds and/or minutes. A previously described comparison of sensor data makes a detection of faults at arresters possible by short-term measurements.

The monitoring system can be designed to detect faults by comparison of the individual currents across individual arresters, in particular across each individual arrester separately from other arresters. Individual currents across individual arresters can be measured easily and economically by sensors at the various arresters, in particular shunt resistors, coils and/or optical sensors, for example in the form of optical waveguides.

The monitoring system can be designed to detect faults by comparing the temperature of individual arresters with one another, in particular the temperature of each arrester with all other arresters. Temperatures of individual arresters can be measured easily and economically by sensors at the various arresters, in particular temperature sensors, such as thermistors, thermocouples, thermopiles, digital and platinum and/or silicon sensors, and/or thermal imaging cameras. Sensors such as thermal imaging cameras additionally make it possible to perform a temperature measurement of a plurality of arresters simultaneously, resolved for each individual arrester. Here, the optical/thermal elements, i.e. the individual measurement points shown in the thermal image as pixels, which are oriented towards an arrester and image the arrester thermally, form the sensor assigned to the arrester.

The monitoring system can comprise at least one data processing unit, data memory unit, data display unit and/or data transmission unit. The units make it possible in particular to perform an automatic comparison of the sensor data, a storage of data in particular for long-term presentations, a further processing of the data and/or preparation of the data, for example for warnings, graphical presentations and/or data transmissions, and a presentation and/or data transmission, for example at a central control room and/or hand-held devices, such as laptops, mobile phones and/or tablets.

The monitoring system can be arranged spatially locally at the location of the arresters. A high reliability, without connection problems and data transmission errors is thus possible, and a local querying, for example for maintenance staff, is made possible on site.

The monitoring system can comprise a spatially remotely arranged central control center and/or can be connected in terms of information technology to a spatially remotely arranged central control center, in particular via LAN, Modbus, radio and/or Internet. Remote monitoring and/or remote maintenance is thus possible, with few staff and low associated costs. Open-loop and/or closed-loop control of the power network and/or of components of the power network, such as current generators, current consumers, switches, measurement devices, and/or lines, is thus possible. Faulty arresters or components connected thereto can thus be switched off or separated from the network centrally.

The arresters can be designed for medium and/or high voltages. The previously described advantages are advantageously effective in particular for medium- and high-voltage applications. In this context, medium-voltage applications are classified as lying in the region of a thousand volts up to 71.5 kV, and high-voltage applications in the region of up to 1200 kV.

A method according to the invention for detecting faults at parallel-connected arresters, in particular at arresters of a previously described arrester system, comprises the execution of a comparison in particular of current measured values of the arresters and/or of sensors of the arresters, wherein a fault is detected in the event of deviations between measured values of different arresters, and the arrester system is identified as being fault-free in the event of substantially identical measured values of the arresters, in particular of all arresters.

Measured values of the arresters can comprise current values, in particular leakage current values, and/or measured values of the arresters can comprise temperature values, in particular the temperature of individual arresters.

Measured values can be measured by sensors at each arrester, in particular for current and/or temperature of each arrester of the arrester system.

Measured values in particular of all arresters can be measured jointly, in particular temperature values by at least one thermal imaging camera.

A comparison can be made of measured values of the arresters and/or of sensors of the arresters that were measured in a short period of time, in particular in a period of time of nanoseconds, milliseconds, seconds and/or minutes, and/or the method can be performed, in particular repeatedly, and/or completed within a period of time of nanoseconds, milliseconds, seconds and/or minutes.

In the event of a detection of at least one faulty arrester, a warning and/or information can be output locally and/or in at least one central control room and/or on hand-held devices. The output can be made for example automatically, in particular in the form of a warning sound and/or a light signal and/or an electronic warning.

The advantages of the method according to the invention for detecting faults at parallel-connected arresters, in particular at arresters of a previously described arrester system, as claimed are analogous to the previously described advantages of the arrester system according to the invention as claimed, and vice versa.

In the following, an exemplary embodiment of the invention will be shown schematically in the sole figure and described in greater detail hereinafter.

BRIEF DESCRIPTION OF THE FIGURES

Figure shows schematically the principle of an arrester system 1 according to the invention, with at least two parallel-connected arresters 2, which each comprise a sensor 3 for determining leakage currents, and comprising a monitoring system 4 which is designed to detect faults at arresters 2 in particular in short time intervals by comparison of sensor data.

DETAILED DESCRIPTION OF THE INVENTION

The principle of an arrester system 1 according to the invention is shown schematically in FIG. 1. The arrester system 1 comprises at least two parallel-connected arresters 2, shown in the figure as three arresters 2 with the three-dot symbol . . . for further arresters 2. The arrester system 1 can alternatively also comprise only two arresters 2. The arresters 2 each have a sensor 3 for determining leakage currents. Further sensors can be comprised by one arrester 2, or a plurality of arresters 2 can comprise one sensor 3 which is designed to determine measured values resolved for each arrester 2, in particular individually. For the sake of simplicity, just one sensor 3 for each arrester 2 is shown in the drawings. The arresters 2 are formed for example as an air- or gas-insulated surge arrester, for example as a metal-oxide arrester with an insulator housing, in particular made of ceramic, silicone and/or composite materials, which for example has ribs on the outer periphery, or with a metal housing. Details of the arresters are not shown in the FIG. for the sake of simplicity.

Sensors 3 are designed for example in the form of shunt resistors, coils and/or optical sensors, in particular in the form of optical waveguides, at the various arresters 2. Individual currents thus can be measured via individual arresters 2. Alternatively or additionally, sensors 3 comprise and/or are temperature sensors which are designed to measure temperatures of individual arresters. Temperature sensors are, for example, thermistors, thermocouples, thermopiles, digital and platinum and/or silicon sensors, and/or thermal imaging cameras. Sensors such as thermal imaging cameras additionally allow a temperature measurement of a plurality of arresters simultaneously, with a resolution of the temperature for each individual arrester.

The arrester system 1 according to the invention, as is shown in the figure, comprises a monitoring system 4 which is designed to detect faults at arresters 2 in particular in short time intervals by comparing sensor data. Short time intervals are, for example, timespans of nanoseconds, milliseconds, seconds and/or minutes. Short-term measurement of the sensors 3, in particular measurements with a duration in the range of nanoseconds, milliseconds, seconds and/or minutes, allow a detection of faults at individual arresters 2 and/or at groups of arresters. The monitoring system 4 comprises at least one data processing unit which processes and evaluates the sensor data promptly, in particular immediately. A fault at an arrester 2 can thus be displayed and/or for example an alarm can be triggered immediately or at least promptly, i.e. within for example nanoseconds, milliseconds, seconds and/or minutes.

Arranged spatially locally at the location of the arrester 2, a detected fault at an arrester 2 is displayed by a, for example locally arranged, monitoring system 4, in particular at a monitor, a warning light and/or on hand-held devices, in particular for maintenance staff on site. The monitoring system 4 comprises for example a data memory unit which stores sensor data and allows a rendering of the temporal profile of measured values and/or sensor data. Data display units on site comprise, for example as previously described, monitors, warning lights and/or hand-held devices, in particular laptops, mobile phones and/or tablets. Data transmission units, in particular of wired design, for example LAN cables, and/or for radio, for example Bluetooth, W-Lan, mobile communication, are designed to transfer data from sensors, and/or the data processing and/or data memory unit, to data output units.

The monitoring system 4 comprises alternatively or additionally a spatially remotely arranged central control center. A detected fault at an arrester 2 is displayed for example by the monitoring system 4 remotely from the arrester 2, in particular many kilometers away, in the central control center or on hand-held devices, as described previously. A data connection between the central control center and the sensors 3 of the arresters 2 and/or a local data transmission unit allows the data transmission of the sensor data. A data processing and/or data memory unit, which stores sensor data and allows a rendering of the temporal profile of measured values or sensor data, is arranged on site or in the control room or the hand-held devices. Data are transmitted in particular in a wired manner, for example by LAN cable, and/or via radio, for example mobile communication. In the event of a fault of arresters 2, or a fault predicted from the data, maintenance staff are sent on site or maintenance staff on site are informed, in order to perform maintenance on and/or exchange the faulty arrester 2. Further measures can be taken centrally or in a decentralized manner, for example a disconnection and/or connection of equipment, electrical lines and/or current consumers, current generators, and/or power networks.

A fault of one or more arresters 2 is detected or identified by comparing in particular current measured values of the arresters 2 and/or of sensors 3 of the arresters 2. A measurement and/or a comparison of measured values of the arresters or the sensors of the arresters is performed in a short period of time or over long periods of time, for example over hours, days and/or years. A monitoring of the arresters and/or of sensors of the arresters can be performed briefly or over long periods of time, in particular continuously or at regular time intervals. A fault is present in the event of deviations between measured values of different arresters 2. Deviations within certain tolerances can be reliable, wherein furthermore deviations outside the tolerances, which in particular are predefined, serve for identification of faults of the arresters 2. The arrester system 1 is identified as fault-free in the event of substantially identical measured values of the arresters 2 and/or of sensors 3 of the arresters 2, in particular all arresters 2 or sensors 3.

The previously described exemplary embodiments can be combined with one another and/or can be combined with the prior art. For example, arrester systems can thus comprise arresters for medium and/or high voltages. Arresters are, for example, surge arresters for air- and/or gas-insulated applications. Sensors are comprised for example directly by the arrester and/or are arranged physically on the arrester, in particular coils and/or shunt resistors and/or temperature sensors in direct contact with the arrester, or spatially distanced from the resistor, in particular thermal imaging cameras. Data acquisition, data processing, data memory and/or data transmission devices can be arranged locally at the arrester or in the vicinity of the arrester, in particular for a plurality of arresters, and/or centrally or remotely decentralized, in at least one control room or computers, hand-held devices and/or the cloud.

LIST OF REFERENCE SIGNS 1 arrester system
2 arrester
3 sensor
4 monitoring system

The invention claimed is:

1. An arrester system, comprising:
at least two arresters connected in parallel with one another;
each of said arresters having a sensor for determining a leakage current;
a monitoring system connected to said sensors and configured to detect a faulty arrester by comparing a temperature of each of said arresters measured simultaneously with all other said arresters.

2. The arrester system according to claim 1, wherein said monitoring system is configured to detect the faulty arrester by short-term measurements of said sensors, with the short-term measurements having a duration lying in a range selected from the group consisting of nanoseconds, milliseconds, seconds, and minutes.

3. The arrester system according to claim 1, wherein said monitoring system is configured to detect faulty arresters by comparison of individual currents across individual said arresters.

4. The arrester system according to claim 3, wherein said monitoring system is configured to detect a faulty arrester by comparison of individual currents across each individual said arrester separately from other said arresters.

5. The arrester system according to claim 1, wherein the monitoring system comprises at least one data processing unit, a data memory unit, a data display unit, and a data transmission unit.

6. The arrester system according to claim 1, wherein said monitoring system is arranged spatially locally at a location of said arresters.

7. The arrester system according to claim 1, wherein said monitoring system is a spatially remote central control center or is connected to a spatially remote central control center by at least one connection selected from the group consisting of LAN, radio, and Internet.

8. The arrester system according to claim 1, wherein said arresters are configured for medium voltages and/or for high voltages.

9. A method for detecting faults at parallel-connected arresters of an arrester system, the method comprising:
  comparing current measurement values of the arresters or of sensors of the arresters, the current measurement values being current temperature values of each of the arresters, and thereby comparing a temperature of each of the arresters with all other arresters; and
  determining that a respective arrester is a faulty arrester when deviations are detected between the temperature values of different arresters measured simultaneously, and determining that the arrester system is free of faulty arresters when the measurement values of all of the arresters are substantially identical.

10. The method according to claim 9, wherein the measurement values of the arresters comprise current values and temperature values.

11. The method according to claim 9, which comprises measuring the measurement values by sensors on each arrester.

12. The method according to claim 11, which comprises measuring the measurement values with current sensors and/or temperature sensors of each arrester of the arrester system.

13. The method according to claim 9, which comprises jointly measuring the measurement values of all arresters.

14. The method according to claim 13, which comprises jointly measuring temperature values by at least one thermal imaging camera.

15. The method according to claim 9, which comprises comparing the measurement values of the arresters and/or of the sensors of the arresters that were measured in a short period of time selected from the group consisting of a period of time of nanoseconds, of milliseconds, of seconds and of minutes, or performing the method repeatedly and/or completing the method within a period of time selected from the group consisting of nanoseconds, milliseconds, seconds, and minutes.

16. The method according to claim 9, which comprises, upon detecting at least one faulty arrester, outputting a warning or information locally, or in a central control room, or on a hand-held device.

17. A method for detecting faults faulty arresters at parallel-connected arresters of an arrester system, the method comprising:
  providing an arrester system having:
    at least two arresters connected in parallel with one another;
    a monitoring system connected to receive temperature values related to the at least two arresters;
  comparing a temperature value of each of the arresters with all other arresters;
  determining that at least one arrester is a faulty arrester when deviations are detected between simultaneously measured measurement values related to the arresters, and determining that the arrester system is free of faulty arresters when the simultaneously measured measurement values are substantially identical.

* * * * *

UNITED STATES PATENT AND TRADEMARK OFFICE
CERTIFICATE OF CORRECTION

| | | |
|---|---|---|
| PATENT NO. | : 12,461,136 B2 | Page 1 of 1 |
| APPLICATION NO. | : 18/245193 | |
| DATED | : March 14, 2023 | |
| INVENTOR(S) | : Thomas Hiller et al. | |

It is certified that error appears in the above-identified patent and that said Letters Patent is hereby corrected as shown below:

In the Claims

Claim 17, Column 8, Lines 14-31 should read as follows:
17. A method for detecting faulty arresters at parallel-connected arresters of an arrester system, the method comprising:
    providing an arrester system having:
        at least two arresters connected in parallel with one another;
        a monitoring system connected to receive temperature values related to the at least two arresters;
    comparing a temperature value of each of the arresters with all other arresters;
    determining that at least one arrester is a faulty arrester when deviations are detected between simultaneously measured measurement values related to the arresters, and determining that the arrester system is free of faulty arresters when the simultaneously measured measurement values are substantially identical.

Signed and Sealed this
Sixth Day of January, 2026

John A. Squires
*Director of the United States Patent and Trademark Office*